(12) United States Patent
Irimajiri

(10) Patent No.: US 7,818,032 B2
(45) Date of Patent: Oct. 19, 2010

(54) PORTABLE INFORMATION COMMUNICATION TERMINAL

(75) Inventor: Mayu Irimajiri, Tokyo (JP)

(73) Assignee: Sony Ericsson Mobile Communications Japan, Inc. (SEJP)

( * ) Notice: Subject to any disclaimer, the term of this patent is extended or adjusted under 35 U.S.C. 154(b) by 699 days.

(21) Appl. No.: 11/540,545

(22) Filed: Oct. 2, 2006

(65) Prior Publication Data

US 2007/0097074 A1 May 3, 2007

(30) Foreign Application Priority Data

Oct. 28, 2005 (JP) .............. P2005-315404

(51) Int. Cl.
  *H04B 1/38* (2006.01)
(52) U.S. Cl. .............. 455/566; 345/156; 345/184; 345/684; 715/830; 715/831
(58) Field of Classification Search .............. 455/550.1, 455/566, 158.4; 379/387.01, 419–440; 345/156, 345/184, 684; 715/830, 831
  See application file for complete search history.

(56) References Cited

U.S. PATENT DOCUMENTS

| | | | |
|---|---|---|---|
| 6,415,164 B1 * | 7/2002 | Blanchard et al. ........... | 455/566 |
| 2004/0253989 A1 * | 12/2004 | Tupler et al. ................. | 455/566 |
| 2005/0119031 A1 * | 6/2005 | Spalink et al. ............... | 455/566 |
| 2007/0281675 A1 * | 12/2007 | Pletikosa et al. ............. | 455/418 |
| 2007/0300180 A1 * | 12/2007 | Hama et al. .................. | 715/787 |

FOREIGN PATENT DOCUMENTS

| | | |
|---|---|---|
| JP | 11-163996 A | 6/1999 |
| JP | 11-237942 A | 8/1999 |
| JP | 2000-030575 | 1/2000 |

OTHER PUBLICATIONS

Japanese Office Action issued Jul. 29, 2009 for corresponding Japanese Application No. 2005-315404.

* cited by examiner

*Primary Examiner*—Charles N Appiah
*Assistant Examiner*—John B Byrd, Jr.
(74) *Attorney, Agent, or Firm*—Rader, Fishman & Grauer PLLC

(57) ABSTRACT

A portable information communication terminal includes an operation unit composed of an integrated combination of a first operation detection device for detecting an operation in a first direction substantially parallel to a predetermined axis direction of a terminal housing and a second operation detection device for detecting an operation in a second direction substantially opposite to the first direction, a display unit provided with a screen disposed in a direction substantially parallel to the predetermined axis direction and capable of displaying a hierarchical menu structure, and a control unit for sequentially changing and displaying menu hierarchies in descending hierarchical order in the first direction on the screen of the display unit in accordance with an operation in the first direction and for sequentially changing and displaying menu hierarchies in ascending hierarchical order in the second direction on the screen in accordance with an operation in the second direction.

5 Claims, 8 Drawing Sheets

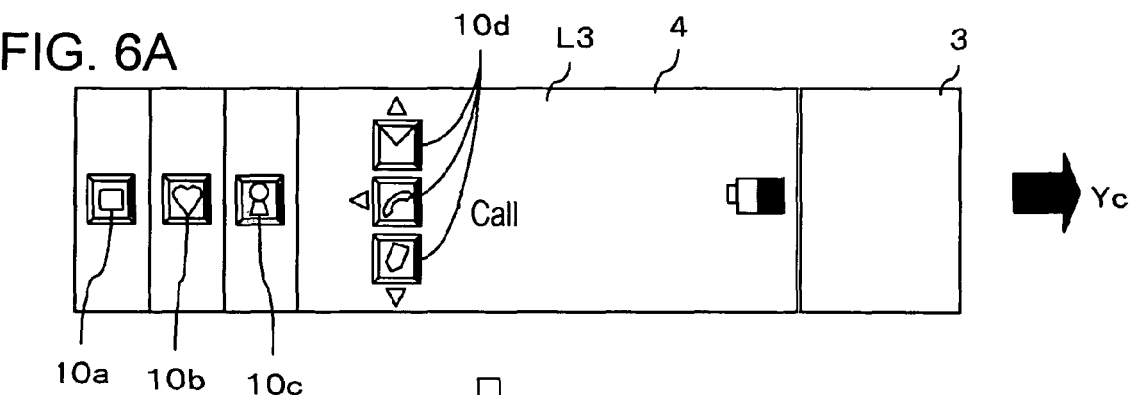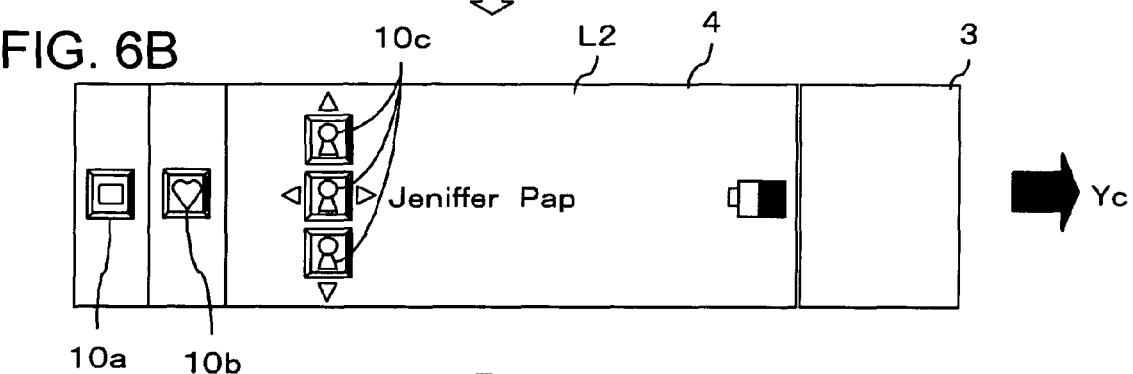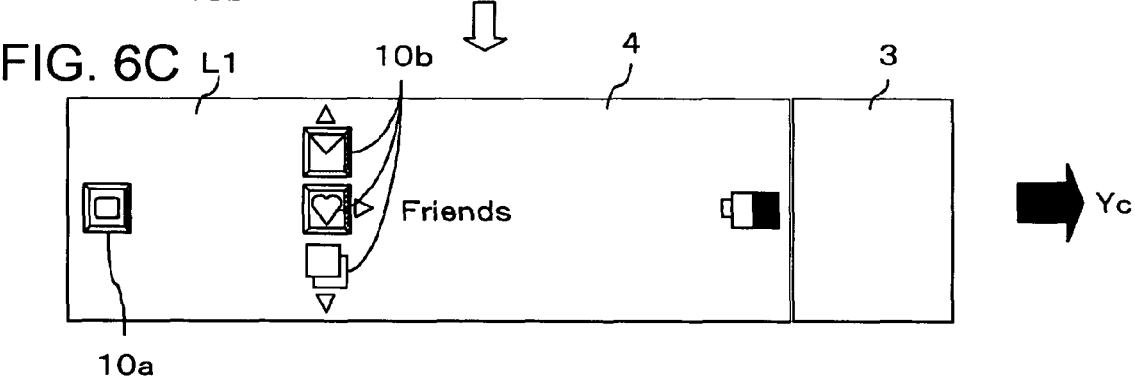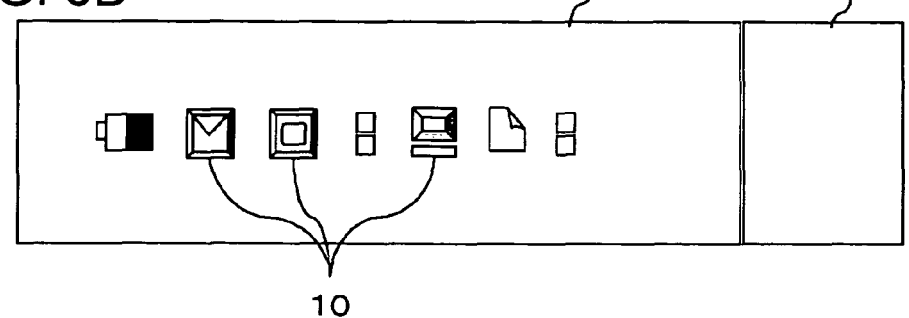

PORTABLE INFORMATION COMMUNICATION TERMINAL

CROSS REFERENCES TO RELATED APPLICATIONS

The present invention contains subject matter related to Japanese Patent Application JP 2005-315404 filed in the Japanese Patent Office on Oct. 28, 2005, the entire contents of which are incorporated herein by reference.

BACKGROUND OF THE INVENTION

1. Field of the Invention

The present invention relates to portable information communication terminals, such as mobile telephone terminals, and, more particularly, to GUIs (Graphical User Interfaces) operatively associated with operation devices for portable information communication terminals.

2. Description of the Related Art

Currently, with the proliferation of mobile telephone terminals, many people have mobile telephone terminals. Users select a mobile telephone terminal with a desired design and operability from among mobile telephone terminals with various types of designs and operability on the market and buy and use the selected one.

Japanese Unexamined Patent Application Publication No. 2000-30575 (FIGS. 2 and 4) discloses a mobile station provided with a display, a keyboard, and an operating knob for using a menu. In this mobile station, an item is selected on the menu by rotating the operating knob, and a function is performed by pushing the operating knob, the last performed function is disabled by pulling the operating knob.

SUMMARY OF THE INVENTION

The design and the operability of a mobile telephone terminal are important factors in boosting the sales figures of the mobile telephone terminal. Therefore, it can be considered that each company will distinguish its terminals from the competitors' terminals by providing terminals with various types of design and operability to the market.

On the other hand, if the design and operability of a mobile telephone terminal is significantly changed from those of known mobile telephone terminals, it can be predicted that the shape and operation method of an operation device of the terminal and the number of operation devices of the terminal will be significantly different from those of known terminals. Furthermore, if the new operation device whose shape and operation method is different from those of known terminals is incorporated into a mobile telephone terminal, a new GUI suitable for the operation of the new operation device is required. It is needless to say that the new operation device and GUI should be user-friendly.

It is desirable to provide a portable information communication terminal capable of achieving a new user-friendly GUI corresponding to an operation device that is incorporated into a portable information communication terminal of a newly employed design.

A portable information communication terminal according to an embodiment of the present invention includes an operation unit composed of an integrated combination of a first operation detection device for detecting an operation in a first direction substantially parallel to a predetermined axis direction of a terminal housing and a second operation detection device for detecting an operation in a second direction substantially opposite to the first direction, a display unit provided with a screen disposed in a direction substantially parallel to the predetermined axis direction and capable of displaying a hierarchical menu structure, and a control unit for sequentially changing and displaying menu hierarchies in descending hierarchical order in the first direction on the screen of the display unit in accordance with an operation in the first direction detected by the first operation detection device and for sequentially changing and displaying menu hierarchies in ascending hierarchical order in the second direction on the screen of the display unit in accordance with an operation in the second direction detected by the second operation detection device.

According to a portable information communication terminal according to an embodiment of the present invention, the operation directions of the operation unit are associated with the directions in which menu hierarchies can be changed and displayed in descending or ascending hierarchical order on the screen of the display unit. Accordingly, when an operation in the first or second direction is performed by the operation unit, menu hierarchies are changed and displayed in the first or second direction on the screen of the display unit.

BRIEF DESCRIPTION OF THE DRAWINGS

FIGS. 6A through 6D are diagrams showing exemplary screens for describing that a menu transition from a lower hierarchy to a higher hierarchy occurs in accordance with the operation of the four-directional jog device in the mobile telephone terminal according to an embodiment of the present invention;

DESCRIPTION OF THE PREFERRED EMBODIMENT

A portable information communication terminal according to an embodiment of the present invention will be described with reference to the accompanying drawings.

In this embodiment, a mobile telephone terminal is taken as an example of the portable information communication terminal according to an embodiment of the present invention. However, the description that will be given in this embodiment is merely illustrative, and the present invention is not limited to the mobile telephone terminal.

External Appearance and Configuration of Mobile Telephone Terminal

Figure 1:
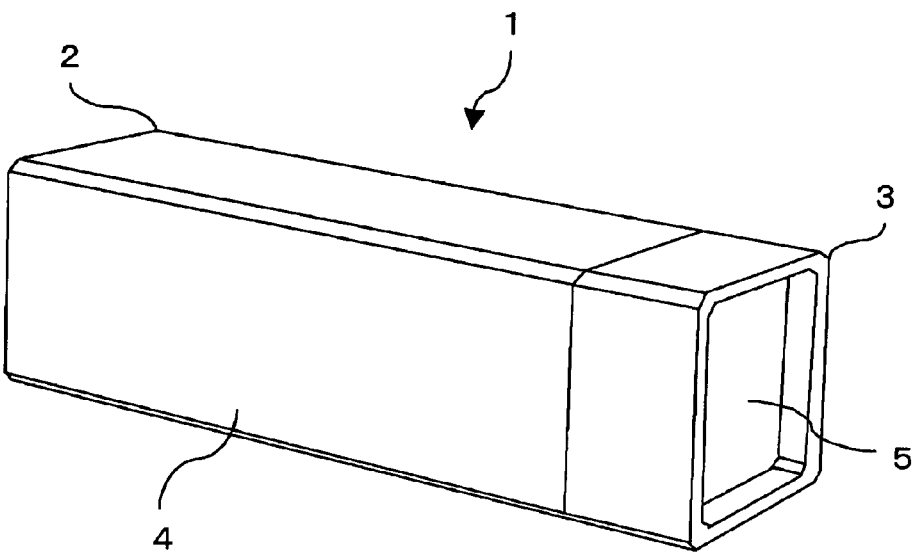
FIG. 1 is a schematic perspective view of an external appearance of a mobile telephone terminal according to an embodiment of the present invention.

The schematic external appearance of a mobile telephone terminal 1 according to an embodiment of the present invention is shown in FIGS. 1 trough 4.

A terminal main body 2 of the mobile telephone terminal 1 according to this embodiment has a substantially rectangular-parallelepiped shape as shown in FIGS. 1 through 4 and is provided with circuitry (described later) inside of its housing. A display 4 configured with, for example, an LCD (Liquid Crystal Display) is disposed on one rectangular major surface of the housing of the terminal main body 2. A light guide unit is disposed on each rectangular major surface of the housing of the terminal main body 2. However, on the major surface on which the display 4 is disposed, the light guide unit is disposed on the underside surface of the display 4. In the light guide unit, LED (Light Emitting Diode) light enters through, for example, the side surface of the light guide unit and is diffused onto a predetermined pattern area and is then externally emitted from the housing of the terminal main body 2.

On the display 4, for example, the display of a standby screen, icons representing hierarchically organized menu items (described later), an incoming call screen, the telephone number and name of a called or calling party when a telephone call is made or received, a telephone book (an address book), Internet addresses, or the date and time is performed. In addition, the creation of e-mail messages and the display of messages to be edited and e-mail addresses are performed on the display 4. Incoming call alerts may be performed by causing an LED disposed on the side surface of the above-described light guide unit to emit light and lighten the above-described predetermined pattern area.

A four-directional jog device 3 is disposed at one end in the long axis direction of the housing of the terminal main body 2 of the mobile telephone terminal 1 according to this embodiment.

Figure 2:
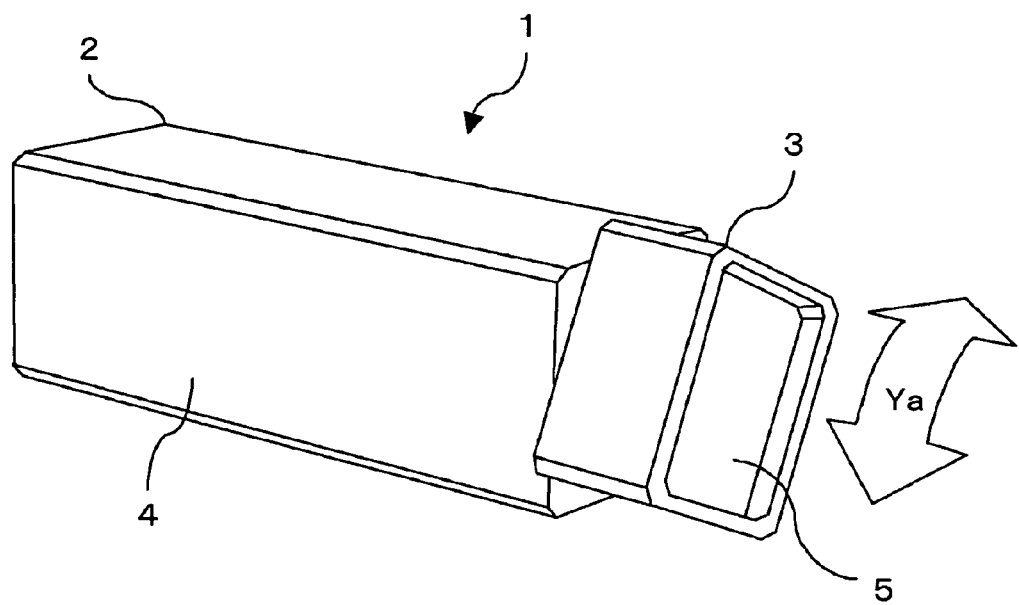
FIG. 2 is a schematic perspective view of an external appearance of the mobile telephone terminal according to an embodiment of the present invention showing a state in which a dialing device of a four-directional jog device is being rotated.
Figure 3:
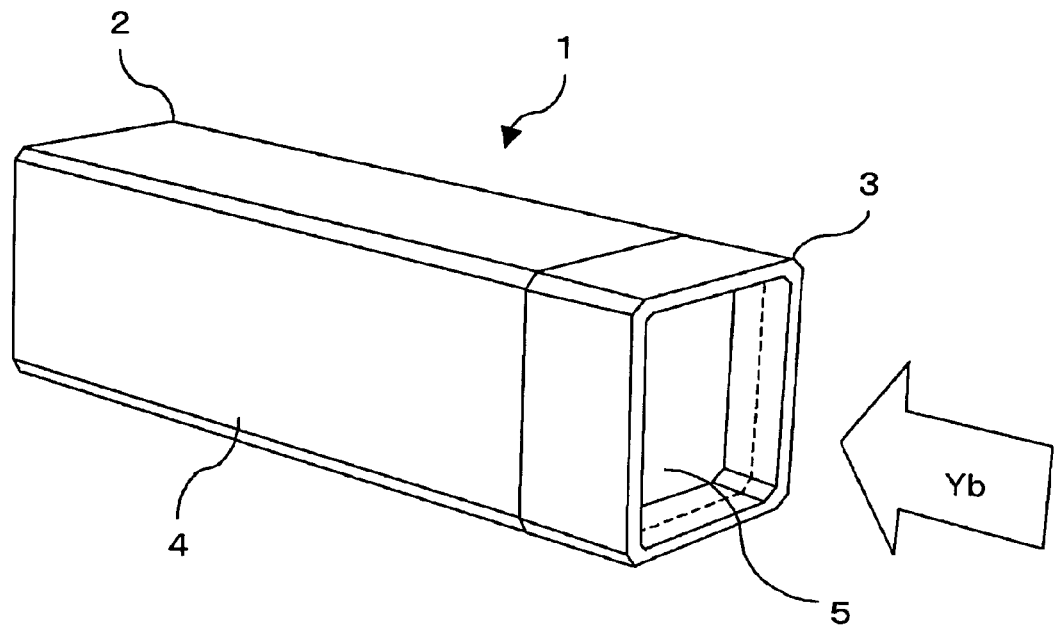
FIG. 3 is a schematic perspective view of an external appearance of the mobile telephone terminal according to an embodiment of the present invention showing a state in which a pushing device of the four-directional jog device is being pushed down.
Figure 4:
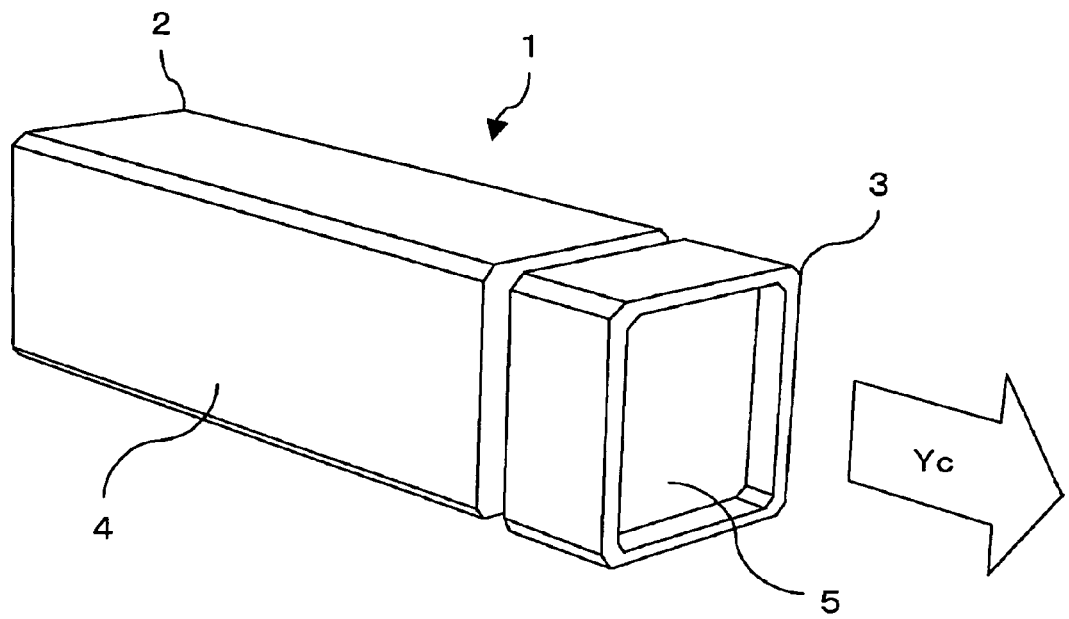
FIG. 4 is a schematic perspective view of an external appearance of the mobile telephone terminal according to an embodiment of the present invention showing a state in which a pulling device of the four-directional jog device is being pulled out.

The four-directional jog device 3 is composed of an integrated combination of a dialing device (the third operation detection device), a pushing device 5 (the first operation detection device), and a pulling device (the second operation detection device). As shown in FIG. 2, the dialing device can rotate about the long axis of the terminal main body 2 in the opposing directions shown by a double-sided arrow Ya. As shown in FIG. 3, the pushing device 5 can be pushed down along the long axis of the terminal main body 2 in the direction shown by an arrow Yb. As shown in FIG. 4, the pulling device can be pulled out along the long axis of the terminal main body 2 in the direction shown by an arrow Yc. The four-directional jog device 3 can be operated in four directions in total, that is, two opposing directions shown by the double-sided arrow Ya in which the above-described dialing device rotates, one direction shown by the arrow Yb in which the above-described pushing device 5 is pushed down, and one direction shown by the arrow Yc in which the above-described pulling device is pulled out. When a user operates the four-directional jog device 3 in any one of the directions, the four-directional jog device 3 can generate an operation signal corresponding to the direction and output of the generated signal to an internal CPU.

Thus, the mobile telephone terminal 1 according to this embodiment is configured to allow a user to select a menu hierarchy and a menu item (described later), make or receive a telephone call, make a connection to the Internet, input data into a telephone book (an address book) or edit the telephone book, and create, edit, send, or receive an e-mail message, in accordance with any one of four directions in which the user operates the four-directional jog device 3.

GUI on Display

An exemplary GUI that is displayed on the display 4 in accordance with the operation of the four-directional jog device 3 is shown in FIGS. 5 through 9. Here, the description of how the display of a menu on the display 4 will be changed in accordance with the operation of the four-directional jog device 3 will be given by way of example. It is needless to say that the GUI described later is merely illustrative, and the present invention is not limited to this GUI.

Figure 5A:
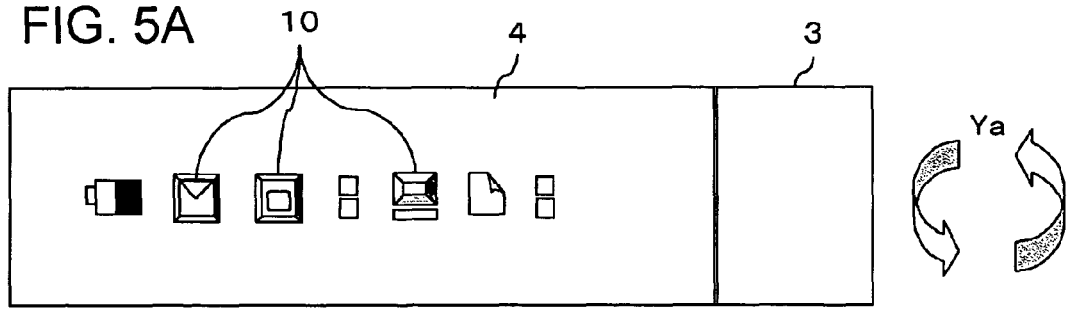
FIGS. 5A through 5D are diagrams showing exemplary screens for describing that a menu transition from a higher hierarchy to a lower hierarchy occurs in accordance with the operation of the four-directional jog device in the mobile telephone terminal according to an embodiment of the present invention.

In the mobile telephone terminal 1 according to this embodiment, for example, a plurality of icons 10 is displayed on the display 4 of the terminal main body 2 in a standby status for an incoming call as shown in FIG. 5A.

Figure 5B:
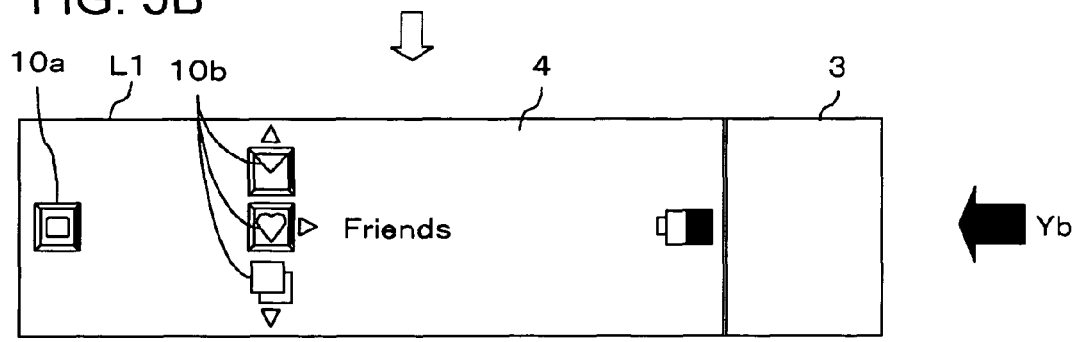

In the standby status shown in FIG. 5A, for example, when the dialing device of the four-directional jog device 3 is rotated in either of the directions shown by the arrow Ya, the mobile telephone terminal 1 according to this embodiment displays a menu screen L1 of the top hierarchy (first hierarchy) on the display 4 as shown in FIG. 5B. On the menu screen L1 of the first hierarchy, an icon 10a representing a transition to a menu selection mode is displayed at the leftmost side (on the side of the other end opposite to the one end at which the four-directional jog device 3 is disposed) of the screen L1, and a plurality of icons 10b, each of which represents one of a plurality of selectable menu items in the top hierarchy, is vertically (more specifically, in the rotation direction of the dialing device, i.e., in the direction perpendicular to the long axis of the terminal main body 2) arranged and displayed. Triangular directional icons indicating directions in which the four-directional jog device 3 can be moved for an operation input are displayed adjacent to the icons 10b. In the case of the example shown in FIG. 5B, as is apparent from the above-described triangular directional icons, the directions in which the four-directional jog device 3 can be moved for an operation input are the two directions in which the dialing device can be rotated and the one direction in which the pushing device can be pushed down.

Figure 5C:
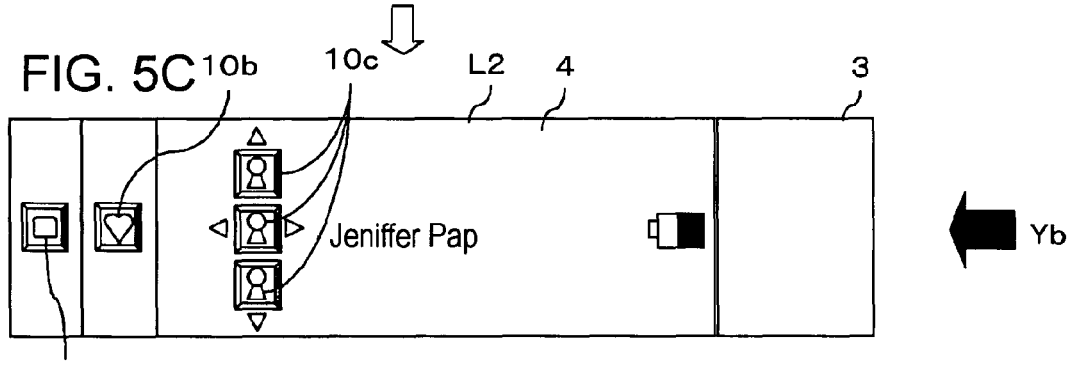

Subsequently, if the pushing device 5 is pushed down in the direction shown by the arrow Yb in the state in which the menu screen L1 of the first hierarchy is displayed as shown in FIG. 5B, the mobile telephone terminal 1 according to this embodiment displays a menu screen L2 of a hierarchy lower than the first hierarchy (i.e., the second hierarchy) on the display 4 as shown in FIG. 5C. On the menu screen L2 of the second hierarchy, the icon 10b of the second hierarchy which corresponds to a menu item selected in the first hierarchy is placed and displayed on the right side of the icon 10a of the first hierarchy, and a plurality of icons 10c, each of which represents one of a plurality of selectable menu items in the second hierarchy, is vertically (in the rotation direction of the dialing device) arranged and displayed. Like the menu screen L1 of the first hierarchy, triangular directional icons indicating directions in which the four-directional jog device 3 can be moved for an operation input are displayed adjacent to the icons 10c. In the case of the example shown in FIG. 5C, as is apparent from the above-described triangular directional icons, the directions in which the four-directional jog device 3 can be moved for an operation input are the two directions in which the dialing device can be rotated, the one direction in which the pushing device can be pushed down, and the one direction in which the pulling device can be pulled out.

Figure 5D:
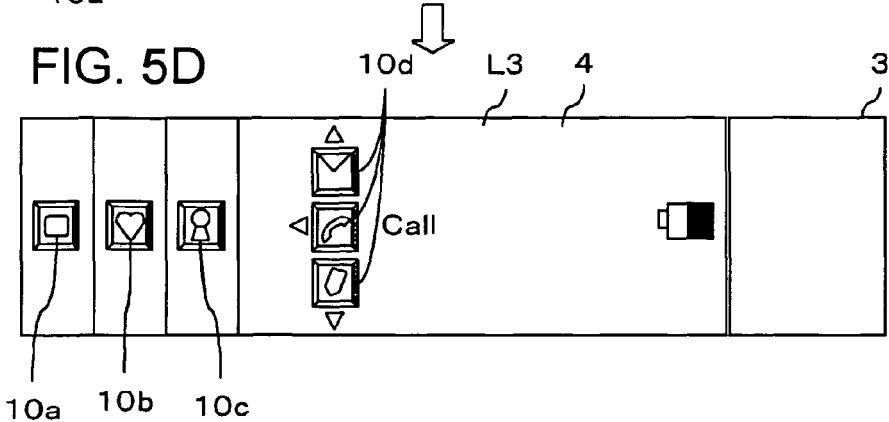

Subsequently, if the pushing device 5 is pushed down in the direction shown by the arrow Yb in the state in which the menu screen L2 of the second hierarchy is displayed as shown in FIG. 5C, the mobile telephone terminal 1 according to this embodiment displays a menu screen L3 of a hierarchy lower than the second hierarchy (i.e., the third hierarchy) on the display 4 as shown in FIG. 5D. On the menu screen L3 of the third hierarchy, the icon 10c of the third hierarchy which corresponds to a menu item selected in the second hierarchy is placed on the right side of the icon 10b of the second hierarchy which is placed on the right side of the icon 10a of the first hierarchy, and a plurality of icons 10d, each of which represents one of a plurality of selectable menu items in the third hierarchy, is vertically arranged and displayed. Like the menu screens L1 and L2, triangular directional icons indicating directions in which the four-directional jog device 3 can be moved for an operation input are displayed adjacent to the icons 10d. In the case of the example shown in FIG. 5D, as is apparent from the above-described triangular directional icons, the directions in which the four-directional jog device 3 can be moved for an operation input are the two directions in which the dialing device can be rotated and the one direction in which the pulling device can be pulled out.

On the other hand, if the pulling device is pulled out in the direction shown by the arrow Yc in the state in which the menu screen L3 of the third hierarchy is displayed as shown in FIG. 6A (same as the display status shown in FIG. 5D), the mobile telephone terminal 1 according to this embodiment displays the menu screen L2 of the second hierarchy as shown in FIG. 6B by returning the display status of the display 4 to that shown in FIG. 5C.

Furthermore, if the pulling device is pulled out in the direction shown by the arrow Yc in the state in which the menu screen L2 of the second hierarchy is displayed as shown in FIG. 6B (same as the display status shown in FIG. 5C), the mobile telephone terminal 1 according to this embodiment displays the menu screen L1 of the first hierarchy as shown in FIG. 6C by returning the display status of the display 4 to that shown in FIG. 5B.

Similarly, if the pulling device is pulled out in the direction shown by the arrow Yc in the state in which the menu screen L1 of the first hierarchy is displayed as shown in FIG. 6C (same as the display status shown in FIG. 5B), the mobile telephone terminal 1 according to this embodiment displays a standby screen as shown in FIG. 6D by returning the display status of the display 4 to the standby status shown in FIG. 5A.

Figure 7:
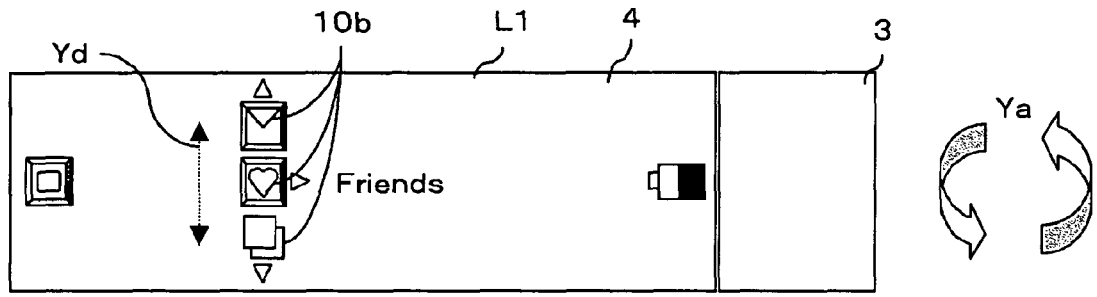
FIG. 7 is a diagram showing an exemplary screen for describing that menu items are scrolled through in a first hierarchy in accordance with the rotation operation of the dialing device in the mobile telephone terminal according to an embodiment of the present invention.

For example, if the dialing device is rotated in either of the directions shown by the arrow Ya in the state in which the menu screen L1 of the first hierarchy is displayed as shown in FIG. 5B or FIG. 6C, the mobile telephone terminal 1 according to this embodiment performs vertical scrolling display of the icons 10b, which are vertically arranged as selectable icons in the first hierarchy, in accordance with the rotation direction of the dialing device as shown in FIG. 7.

Figure 8:
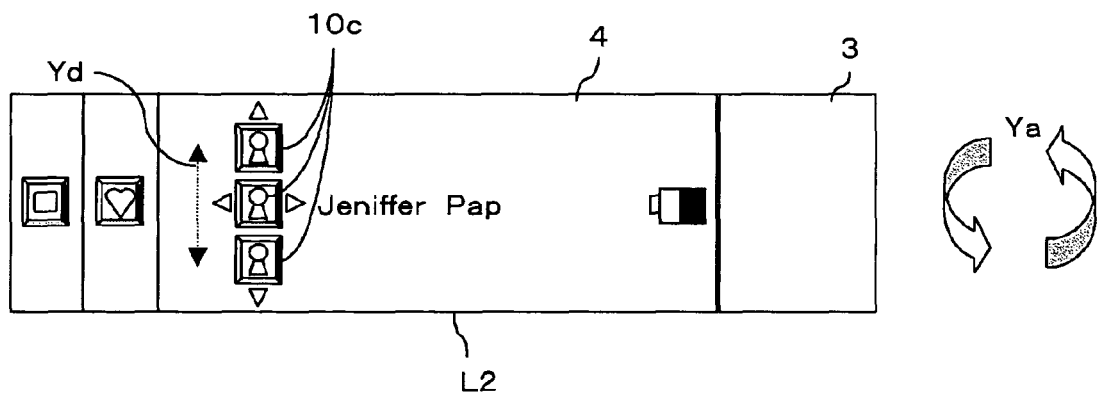
FIG. 8 is a diagram showing an exemplary screen for describing that menu items are scrolled through in a second hierarchy in accordance with the rotation operation of the dialing device in the mobile telephone terminal according to an embodiment of the present invention.

Similarly, if the dialing device is rotated in either of the directions shown by the arrow Ya in the state in which the menu screen L2 of the second hierarchy is displayed as shown in FIG. 5C or FIG. 6B, the mobile telephone terminal 1 according to this embodiment performs a vertical scrolling display of the icons 10c, which are vertically arranged as selectable icons in the second hierarchy, in accordance with the rotation direction of the dialing device as shown in FIG. 8.

Figure 9:
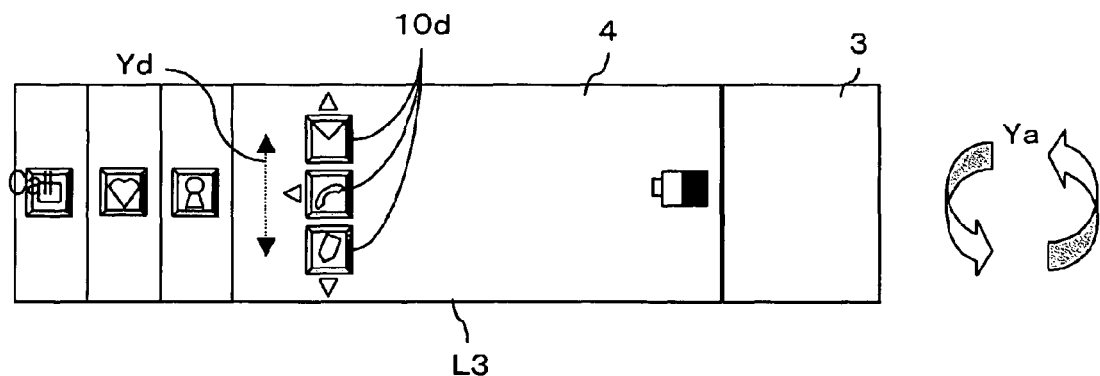
FIG. 9 is a diagram showing an exemplary screen for describing that menu items are scrolled through in a third hierarchy in accordance with the rotation operation of the dialing device in the mobile telephone terminal according to an embodiment of the present invention.

Similarly, if the dialing device is rotated in either of the directions shown by the arrow Ya in the state in which the menu screen L3 of the third hierarchy is displayed as shown in FIG. 5D or FIG. 6A, the mobile telephone terminal 1 according to this embodiment performs a vertical scrolling display of the icons 10d, which are vertically arranged as selectable icons in the third hierarchy, in accordance with the rotation direction of the dialing device as shown in FIG. 9.

Thus, the mobile telephone terminal 1 according to this embodiment displays the menu list of the top hierarchy on the display 4 when the dialing device of the four-directional jog device 3 is rotated in the standby state, sequentially changes menu hierarchies in descending hierarchical order when the pushing device 5 of the four-directional jog device 3 is pushed down in the state in which the menu list is displayed, and sequentially changes menu hierarchies in ascending order when the pulling device is pulled out in the state in which the menu list is displayed (that is, the pulling device corresponds to, for example, a "clear" or "back" button for a transition to an antecedent operation or stage). In addition, even if the menu hierarchy transition from a higher hierarchy to a lower hierarchy occurs, the mobile telephone terminal 1 according to this embodiment keeps the icon of a menu item selected in the higher hierarchy displayed in the lower hierarchy. Furthermore, the mobile telephone terminal 1 performs a vertical scrolling display of the icons of menu items selectable in a current menu hierarchy in accordance with the rotation operation of the dialing device when the dialing device is rotated in the state in which the menu list is displayed. That is, according to this embodiment, a basic menu structure is expanded using two axes, i.e., the Y axis in the direction in which a transition between menu hierarchies is displayed, and the X axis in the direction in which menu items to be selected in a menu hierarchy are displayed, and an item selected in an antecedent hierarchy is kept displayed.

Configuration of Mobile Telephone Terminal and Accessory Device

Figure 10:
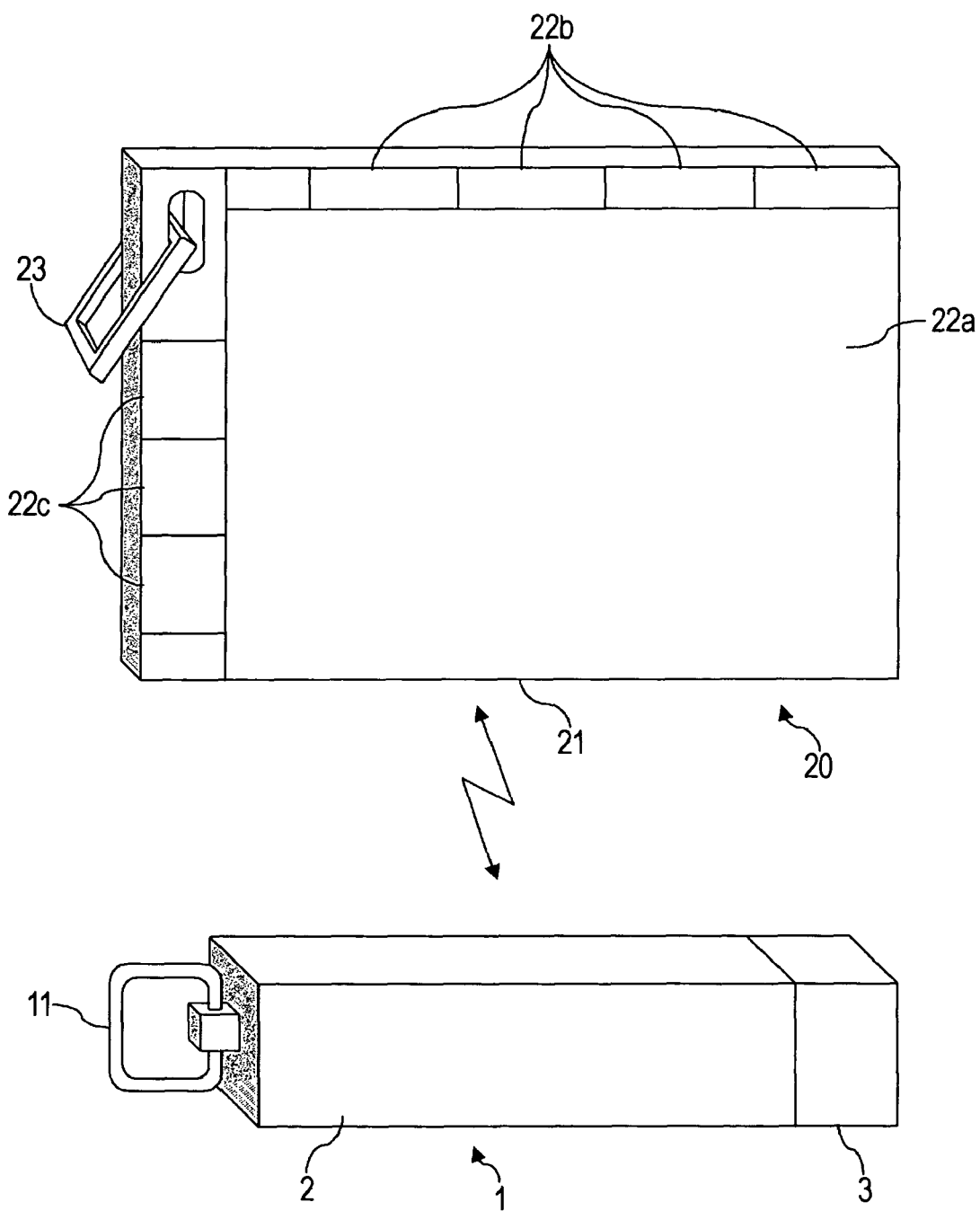
FIG. 10 is a perspective view of external appearances of the mobile telephone terminal and an accessory device according to an embodiment of the present invention.

The mobile telephone terminal 1 according to this embodiment can perform basic functions required for a mobile telephone terminal, such as the selection of a menu hierarchy and a menu item, the sending and receiving of calls, an Internet connection, the editing of or input into a telephone book (address book), and the creation, editing, sending, and receiving of e-mail messages by displaying data on the display 4 and performing an operation input using the four-directional jog device 3. However, the display 4 has a limited display area, and the number of operation instructions that a user can input using the four-directional jog device 3 and the number of devices that can be incorporated in a small housing are limited. Accordingly, in this embodiment, for example, an accessory device 20 shown in FIG. 10 performs data communication with the mobile telephone terminal 1 using short-range wireless communication, such as Bluetooth® communication, whereby various functions other than the above-described basic functions also can be performed.

That is, the mobile telephone terminal 1 also has a function of transmitting or receiving data to or from the accessory device 20 using short-range wireless communication such as Bluetooth® communication.

On the other hand, the accessory device 20 is provided with a short-range communication unit for transmitting or receiving data to or from the mobile telephone terminal 1, a display 21 having a screen larger than that of the display 4 of the mobile telephone terminal 1, a touch panel 22 disposed on the surface of the display 21 and composed of a transparent member, and a digital camera unit and speaker unit (not shown) disposed on the underside surface opposite to the surface on which the display 21 is disposed.

The area of the touch panel 22 is divided into a free input area 22a and soft key areas 22b and 22c to which a plurality of predetermined soft keys are assigned. It is needless to say that the whole area of the touch panel 22 may be a free input area, and the area setting of the touch panel 22 may be freely changed depending on an application. In this embodiment, a direct button function for directly performing each function of the accessory device 20, such as data communication with the digital camera unit or the mobile telephone terminal 1, is assigned to the soft key area 22b, and a common application button function, such as an enter operation function or a menu selection function which is jointly used for each application, is assigned to the soft key area 22c. A freehand input is performed upon the free input area 22a, or a software full keyboard may be assigned to the free input area 22a.

According to the accessory device 20 provided with the large display 21, the touch panel 22, and the digital camera unit, and capable of linking to the mobile telephone terminal 1 using short-range wireless communication, the input of various operation instructions, the selection of a menu hierarchy and a menu item, the editing of or inputting into the telephone book (address book) of the mobile telephone terminal 1, the sending and receiving of calls via the mobile telephone terminal 1, the creation and editing of long e-mail messages, the sending and receiving of e-mail messages via the mobile telephone terminal 1, the display of images obtained by the digital camera unit, and web browsing via the mobile telephone terminal 1 can be achieved.

In this embodiment, the accessory device 20 and the mobile telephone terminal 1 may be provided with an exchangeable fashion-accessory-attaching unit 23 and a fashion-accessory-attaching unit 11, respectively.

Internal Configuration of Mobile Telephone Terminal

Figure 11:
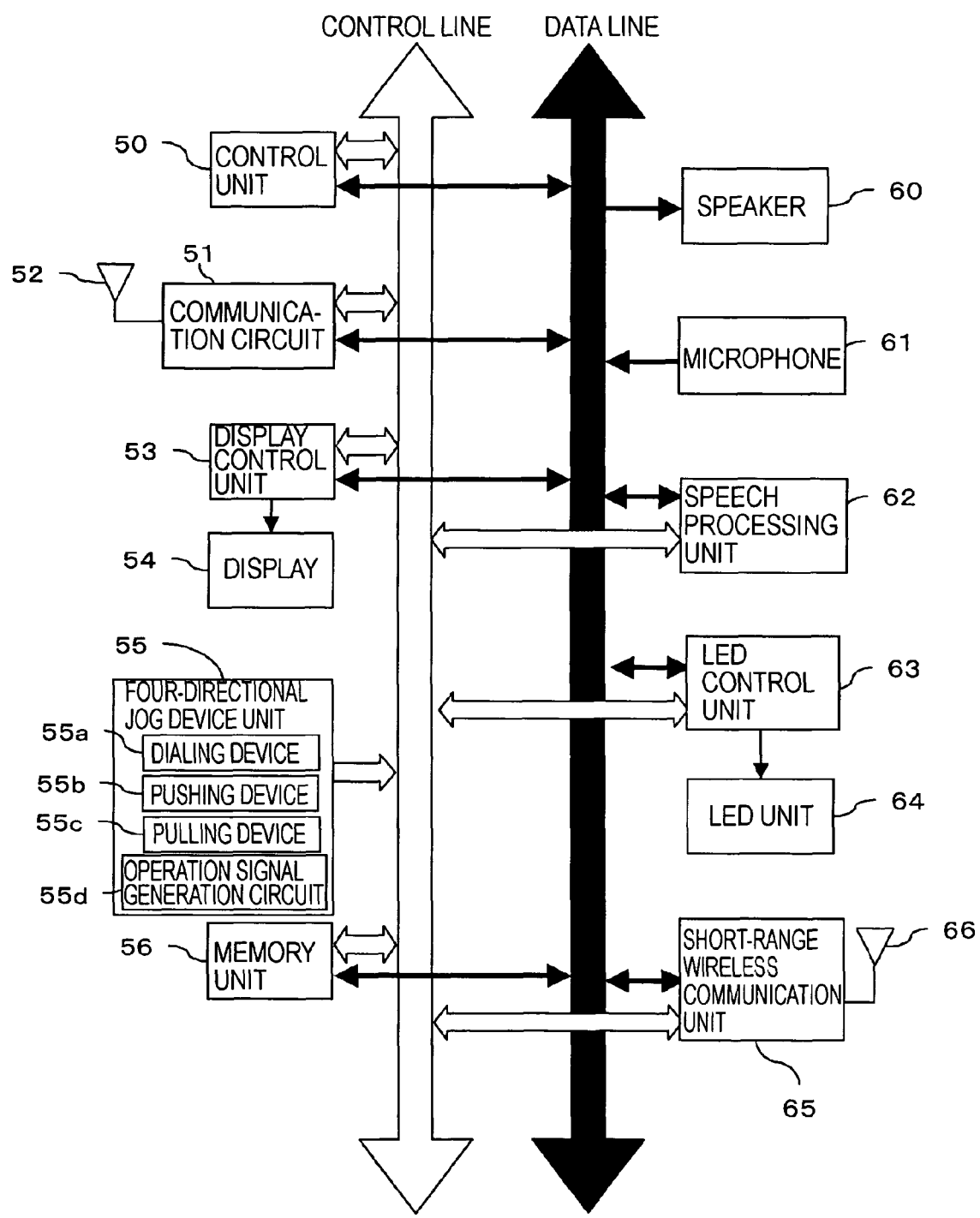
FIG. 11 is a block diagram showing the schematic internal configuration of the mobile telephone terminal according to an embodiment of the present invention.

The schematic internal configuration of the mobile telephone terminal 1 according to this embodiment is shown in FIG. 11.

Referring to FIG. 11, a data line is a transmission line for transmitting various types of data, such as speech data, e-mail data, and image data.

A control line is a transmission line for transmitting various control information, such as control data transmitted from a control unit 50 configured with a CPU (Central Processing Unit).

An antenna 52 incorporated into the terminal main body 2 is connected to a communication circuit 51 and is used to transmit or receive a signal wave to or from a base station.

The communication circuit 51 performs a frequency conversion, a modulation, or a demodulation upon a received signal or a signal to be transmitted.

Speech voice data transmitted via the communication circuit 51 from the antenna 52 is transmitted to a speech processing unit 62, and other received data is transmitted to the control unit 50 and is adequately processed and then transmitted from the control unit 50 to each unit as needed. The received data other than the speech voice data is data for packet communication, such as e-mail data, image data on a moving image or a still image, music data, HTML (Hyper Text Markup Language) data, and program code data.

Upon receiving the speech voice data via the communication circuit 51 from the antenna 52, the speech processing unit 62 decodes the speech voice data, converts the decoded speech voice data into an analog speech signal, and transmits the analog speech signal to a speaker 60 or an earphone jack (not shown).

The speaker 60 incorporated into the terminal main body 2 amplifies the received analog speech signal using an internal amplifier, converts the amplified analog speech signal into audible speech, and then outputs the audible speech externally, whereby speech voice is output from the speaker 60.

A microphone 61 incorporated into the terminal main body 2 converts input speech into an analog speech voice signal, amplifies the analog speech voice signal using an internal amplifier, and then transmits the analog speech voice signal to the speech processing unit 62.

Upon receiving the speech voice signal from the microphone 61, the speech processing unit 62 converts the speech voice signal into digital speech voice data, encodes the converted digital speech voice data, and then transmits the encoded speech voice data to the communication circuit 51, whereby a speech voice signal is transmitted from the antenna 52.

A display 54 corresponds to the display 4 disposed on the one main surface of the terminal main body 2. A display control unit 53 is controlled by the control unit 50 and performs a drive control upon the display 54 in accordance with a display signal transmitted from the control unit 50, whereby images and characters are displayed on the display 54.

A four-directional jog device unit 55 is provided with the four-directional jog device 3 composed of an integrated combination of a dialing device 55a, a pushing device 55b (same as the pushing device 5), and a pulling device 55c, and an operation signal generation circuit 55d for generating an operation signal in accordance with the operation of each device of the dialing device 55a, a pushing device 55b, and a pulling device 55c and outputting the generated signal to the control unit 50.

An LED unit 64 incorporated into the terminal main body 2 in which an LED emits light through the side surface of the above-described light guide unit undergoes a light emitting drive control that is performed by an LED control unit 63 under the control of the control unit 50.

A short-range wireless communication unit 65 incorporated into the terminal main body 2 performs data communication with the accessory device 20 via an antenna 66 under the control of the control unit 50.

A memory unit 56 includes a ROM (Read Only Memory) and a RAM (Random Access Memory). The ROM stores the following: an OS (Operating System); a control program allowing the control unit 50 to control each unit; a program code for performing a display control in accordance with an operation signal transmitted from the four-directional jog device unit 55; a program code allowing the short-range wireless communication unit 65 to perform data communication with the accessory device 20; various types of default set value data; font data; dictionary data; various types of sound data for ring tones and notification alerts; a program code for an application for creating, editing, transmitting, and receiving e-mail messages; a program code for an application for performing various types of processing upon speech; program codes for various applications installed into the mobile telephone terminal; and the identifying information (ID) of the mobile telephone terminal. This ROM includes a rewritable ROM, such as a NAND-type flash memory or an EEPROM (Electrically Erasable Programmable Read-only Memory), and can store the following: e-mail data; telephone book data and e-mail address book data; various types of sound data; character data, registration data on word candidates for a prediction conversion function and learning data for a prediction conversion function; and various types of user set value data. The RAM stores data as needed as a work area that allows the control unit 50 to perform data processing.

The control unit 50 configured with a CPU controls the mobile telephone terminal and performs control operations and various computations for achieving various functions according to this embodiment in accordance with the OS and various programs stored in the memory unit 56.

In addition, the mobile telephone terminal 1 has an electronic wallet function that enables noncontact communication, and is provided with a battery charging terminal and a battery (not shown).

Internal Configuration of Accessory Device

Figure 12:
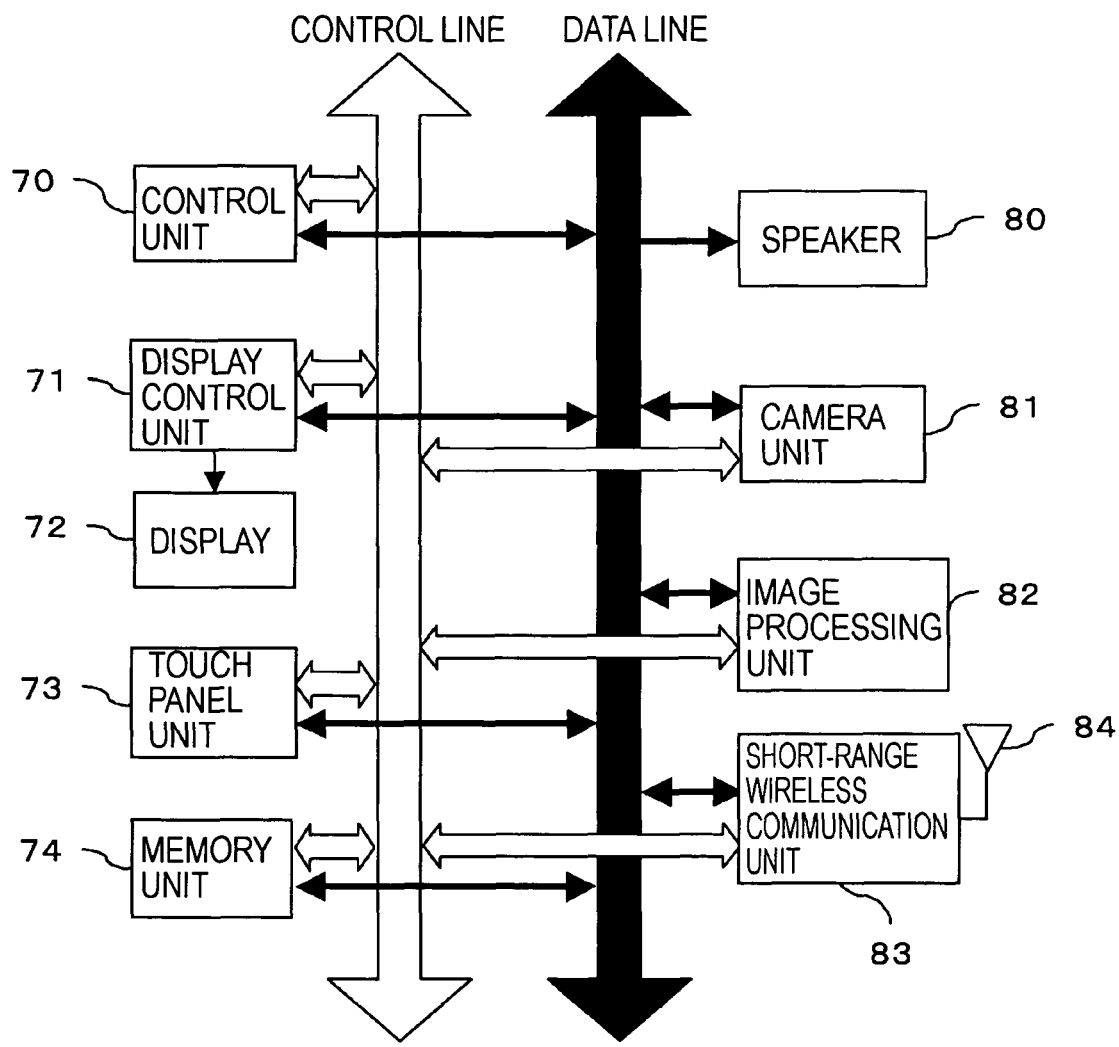
FIG. 12 is a block diagram showing the schematic internal configuration of the accessory device according to an embodiment of the present invention.

The schematic internal configuration of the accessory device 20 according to this embodiment is shown in FIG. 12.

Referring to FIG. 12, a data line is a transmission line for transmitting various types of data, such as speech data, e-mail data, and image data.

A control line is a transmission line for transmitting various control information, such as control data transmitted from a control unit 70 configured with a CPU.

A speaker 80 is disposed on the underside surface opposite to the surface on which the display 21 is disposed. The speaker 80 amplifies a music signal, etc. transmitted from an internal memory (a memory unit 74) using an internal amplifier under the control of the control unit 70, converts the amplified music signal, etc. into audible speech, and then externally outputs the audible speech, whereby music, etc. are output from the speaker 80.

A display 72 corresponds to the display 21. A display control unit 71 is controlled by the control unit 70, and performs a drive control upon the display 72 in accordance with a display signal transmitted from the control unit 70, whereby images and characters are displayed on the display 72.

A touch panel unit 73 corresponds to the touch panel 22. The touch panel unit 73 converts an externally obtained pressing force into a voltage value, performs A/D conversion upon the voltage value to obtain data, generates two-dimensional coordinate data that represents a position of the pressing force on the basis of the obtained data, and then transmits data on the pressing force and the position of the pressing force to the control unit 70 that is an internal CPU.

A camera unit 81 is a digital camera unit disposed on the underside surface opposite to the surface on which the display 21 is disposed. The camera unit 81 generates data on a still or moving image obtained by converting a light image into an electric signal using an image pickup device, and transmits the generated data to an image processing unit 82.

The image processing unit 82 performs expansion decoding upon a compression-coded image data read out from the internal memory (memory unit 74) under the control of the control unit 70, and transmits the expansion-decoded image data to the display control unit 71 via the data line. In addition, the image processing unit 82 performs compression coding upon a still or moving image data obtained by the camera unit 81, transmits the compression-coded image data to the display control unit 71 under the control of the control unit 70, and transmits the compression-coded image data to the internal memory for storage as needed.

A short-range wireless communication unit 83 performs data communication with the mobile telephone terminal 1 via an antenna 84 under the control of the control unit 70.

The memory unit 74 includes a ROM and a RAM. The ROM stores the following: an OS; control programs allowing the control unit 70 to control the camera unit 81, the display control unit 71, the memory unit 74, and the image processing unit 82; a program code for performing a control operation in accordance with an operation signal transmitted from the touch panel unit 73; a program code allowing the short-range wireless communication unit 83 to perform data communication with the mobile telephone terminal 1; a program code for browsing web pages acquired from the Internet, etc.; various types of default set value data; font data; dictionary data; various types of sound data for notification alerts; a program code for an application for creating and editing e-mail messages; a program code for an application for performing various types of processing upon speech; program codes for various applications; and the identifying information (ID) of the accessory device 20. This ROM includes a rewritable ROM, such as a NAND-type flash memory or an EEPROM and can store the following: e-mail data; telephone book data and e-mail address book data; various types of sound data; character data, registration data on word candidates for a prediction conversion function, and learning data for a prediction conversion function and various types of user set value data. The RAM stores data as needed as a work area that allows the control unit 70 to perform data processing.

The control unit 70 configured with a CPU controls the accessory device 20 and performs control operations and various computations for achieving various functions according to this embodiment in accordance with the OS and various programs stored in the memory unit 74.

In addition, the accessory device 20 according to this embodiment has a GPS (Global Positioning System) function, and is provided with a memory card slot for receiving an external memory, a connection terminal for connecting a cable, a battery charging terminal, and a battery (not shown).

SUMMARY

As described above, the mobile telephone terminal 1 according to this embodiment can achieve a new user-friendly GUI corresponding to an operation device that is suitable for a newly employed design, since the operation directions of the operation unit of the mobile telephone terminal 1 according to this embodiment are associated with the directions in which menu hierarchies can be changed and displayed in descending or ascending hierarchical order on the screen of the display unit. The mobile telephone terminal 1 according to this embodiment can achieve a GUI that enables a user to easily know a correspondence between the operation of the four-directional jog device and the hierarchical structure of a menu displayed on the display 4 and the position of a currently selected menu hierarchy in which a selection operation can be performed, since the expansion and browsing of menu hierarchies and a menu item selection can be performed on the display 4 in accordance with the four-directional operation of the four-directional jog device 3 disposed at one end of the terminal main body 2, and the browsing of an item selected in a hierarchy higher than a currently selected hierarchy can be performed in the currently selected hierarchy. Thus, according to this embodiment, a user can intuitively know a link between the operation of the four-directional jog device 3 and the layout of a menu display, that is, the user can intuitively and easily know a predictable next operation and a current position in an often-complicated menu structure.

The above-described embodiment of the present invention is merely illustrative, and therefore the present invention is not limited to the above-described embodiment. It should be understood by those skilled in the art that various modifications, combinations, sub-combinations and alterations may occur depending on design requirements and other factors insofar as they are within the scope of the appended claims or the equivalents thereof.

For example, the portable information communication terminal according to an embodiment of the present invention is not limited to a mobile telephone terminal, and it may be applied to various portable information communication terminals, such as a PDA.

The invention claimed is:

1. A portable information communication terminal comprising:
    an operation unit composed of an integrated combination of a first operation detection device for detecting an operation in a first direction substantially parallel to a predetermined axis direction of a terminal housing, a second operation detection device for detecting an operation in a second direction substantially opposite to the first direction, and a third operation detection device for detecting an operation in a direction in which the operation unit is rotated about the predetermined axis of the terminal housing;
    a display unit provided with a screen disposed in a direction substantially parallel to the predetermined axis direction and capable of displaying a hierarchical menu structure; and
    a control unit for sequentially changing and displaying menu hierarchies in descending hierarchical order in the first direction on the screen of the display unit in accordance with an operation in the first direction detected by the first operation detection device, and for sequentially changing and displaying menu hierarchies in ascending hierarchical order in the second direction on the screen of the display unit in accordance with an operation in the second direction detected by the second operation detection device,
    wherein the control unit performs a scrolling display, on the screen of the display unit, of the arranged and displayed menu items in accordance with a rotation operation detected by the third operation detection device in the direction substantially perpendicular to the first and second direction.

2. The portable information communication terminal according to claim 1, wherein, each time a higher menu hierarchy is changed to a lower menu hierarchy after the first operation detection device has detected an operation in the first direction, the control unit displays on the screen of the display unit in the lower menu hierarchy a menu item that has been selected from among a plurality of menu items in the higher menu hierarchy as information representing the higher menu hierarchy, whereby menu items each of which represents a hierarchy are arranged and displayed in ascending hierarchical order in the second direction on the screen of the display unit.

3. The portable information communication terminal according to claim 2, wherein, each time a lower menu hierarchy is changed to a higher menu hierarchy after the second operation detection device has detected an operation in the second direction, the control unit deletes from the screen of the display unit in the higher menu hierarchy a menu item that has been displayed as information representing the lower menu hierarchy, whereby menu items each of which represents a hierarchy are sequentially deleted in hierarchical ascending order from the screen of the display unit.

4. The portable information communication terminal according to claim 1,
    wherein the predetermined axis direction is a long axis direction of the terminal housing,
    wherein the operation unit is disposed at one end in the long axis direction of the terminal housing,
    wherein the first operation detection device detects an operation in a direction of pushing the operation unit into the one end of the terminal housing, and
    wherein the second operation detection device detects an operation in a direction of pulling out the operation unit from the one end of the terminal housing.

5. The portable information communication terminal according to claim 1,
    wherein the control unit arranges and displays in a direction substantially perpendicular to the predetermined axis direction on the screen of the display unit a plurality of menu items included in a menu hierarchy that has been changed in accordance with an operation detected by the first or second operation detection device.

* * * * *